(12) United States Patent
Ota et al.

(10) Patent No.: US 7,416,815 B2
(45) Date of Patent: Aug. 26, 2008

(54) NEGATIVE ELECTRODE MEMBER FOR LITHIUM BATTERY AND PROCESS FOR PRODUCING THE SAME

(75) Inventors: Nobuhiro Ota, Itami (JP); Nobuyuki Okuda, Itami (JP); Hiryoyuki Ueki, Itami (JP); Tomohiko Ihara, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 455 days.

(21) Appl. No.: 10/542,311

(22) PCT Filed: Apr. 1, 2004

(86) PCT No.: PCT/JP2004/004800

§ 371 (c)(1),
(2), (4) Date: Jul. 15, 2005

(87) PCT Pub. No.: WO2005/101549

PCT Pub. Date: Oct. 27, 2005

(65) Prior Publication Data

US 2006/0127772 A1 Jun. 15, 2006

(51) Int. Cl.
*H01M 4/58* (2006.01)
(52) U.S. Cl. .................. 429/231.95; 429/322; 429/304; 429/248; 29/623.5; 29/623.1; 204/192.12; 427/402; 427/58
(58) Field of Classification Search ............ 429/231.95, 429/322, 304, 248; 29/623.5, 623.1; 204/192.12; 427/402, 58
See application file for complete search history.

(56) References Cited

U.S. PATENT DOCUMENTS

| 4,599,284 | A | 7/1986 | Akridge |
| 5,085,953 | A | 2/1992 | Akridge et al. |
| 5,217,826 | A | 6/1993 | Yamamura et al. |
| 5,314,765 | A | 5/1994 | Bates |
| 5,449,576 | A * | 9/1995 | Anani .................. 429/323 |
| 6,025,094 | A | 2/2000 | Visco et al. |
| 6,365,300 | B1 | 4/2002 | Ota et al. |
| 6,641,863 | B2 | 11/2003 | Kugai et al. |
| 6,656,233 | B2 * | 12/2003 | Kugai et al. ............. 29/623.1 |
| 6,699,619 | B2 | 3/2004 | Kugai et al. |

FOREIGN PATENT DOCUMENTS

| CN | 1333575 A | 1/2002 |
| JP | S59-073851 A | 4/1984 |
| JP | H04-202024 A | 7/1992 |
| JP | H04-231346 A | 8/1992 |
| JP | H05-048582 B2 | 7/1993 |
| JP | H06-054687 B2 | 7/1994 |
| JP | H06-290773 A | 10/1994 |
| JP | 2000-340257 A | 12/2000 |
| JP | 2001-250580 A | 9/2001 |
| JP | 3343936 | 8/2002 |
| JP | 2002-329524 A | 11/2002 |
| JP | 2003-045415 A | 2/2003 |
| JP | 2003-115293 A | 4/2003 |
| JP | 2003-303618 A | 10/2003 |
| JP | 2004-087402 A | 3/2004 |

OTHER PUBLICATIONS

J. H. Kennedy, et al., "Ionically Conductive Sulfide-based Lithium Glasses," Jornal of Non-Crystalline Solids, 123 (1990), pp. 328-338.
Y. Yoneda, et al., "Mixed anion effect on lithium ion conductivity of amorphous materials in the system Li2O-Li2S-P2S5," Extended abstracts of presentations at the 28th Symposium on Solid-State Ionics, Nov. 2002, pp. 24-25.
S. Hama, et al., "Synthesis and High Lithium Ion Conductivity of New Glass-ceramics in the System Li2S-P2S5," Extended abstracts of presentations at the 26th Symposium on Solid-State Ionics, Nov. 2000, pp. 174-175.
M. Murayama, et al., "Synthesis, Property and Structure of New Lithium Ionic Conductor, Thio-LISICON; Lithium Thiophosphate System" Extended abstracts of presentations at the 26th Symposium on Solid-State Ionics, Nov. 2000, pp. 178-179.
N. Machida, et al., "Mechano-chemical Synthesis of Lithium Ion Conducting Materials in the System Li2O-Li2S-P2S5" J. Jpn. Soc. Powder Powder Metallurgy, vol. 51, No. 2, Feb. 2004, pp. 91-97.

* cited by examiner

*Primary Examiner*—Laura S Weiner
(74) *Attorney, Agent, or Firm*—James W. Judge

(57) ABSTRACT

Affords high-stability, high-safety lithium secondary batteries of high energy density and superlative charge/discharge cyclability, in which shorting due to the growth of dendrites from the metallic-lithium negative electrode is kept under control.

A lithium secondary battery negative-electrode component material, formed by laminating onto a substrate a metallic lithium film and an inorganic solid-electrolyte film, the lithium secondary battery negative-electrode component material characterized in that the inorganic solid-electrolyte film incorporates lithium, phosphorous, sulfur, and oxygen, and is represented by the compositional formula noted below.

$$a\text{Li} \cdot b\text{P} \cdot c\text{S} \cdot d\text{O}$$

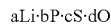

(Li: lithium; P: phosphorous; S: sulfur; O: oxygen), wherein the ranges of the atomic fractions in the composition are:

$$0.20 \leq a \leq 0.45;$$

$$0.10 \leq b \leq 0.20;$$

$$0.35 \leq c \leq 0.60;$$

$$0.03 \leq d \leq 0.13;$$

$$(a+b+c+d=1).$$

4 Claims, No Drawings

NEGATIVE ELECTRODE MEMBER FOR LITHIUM BATTERY AND PROCESS FOR PRODUCING THE SAME

TECHNICAL FIELD

The present invention relates to component materials employing a high-performance solid electrolyte that in lithium secondary battery negative electrodes realize high capacity and high safety, and relates to methods of manufacturing the component materials and to the lithium secondary batteries themselves.

BACKGROUND ART

Lithium-ionic-conductive inorganic solid electrolytes having phosphorous as a component are abundantly known; for example the characteristics of an amorphous solid electrolyte whose composition is $Li_2S$—$P_2S_5$ are set forth in Japanese Examined Pat. App. Pub. No. H05-48582 and in John H. Kennedy, et 2 al., "IONICALLY CONDUCTIVE SULFIDE-BASED LITHIUM GLASSES," *Journal of Non-Crystalline Solids* 123 (1990), pp. 328-338.

Furthermore, in lithium-ion conducting, amorphous inorganic solid electrolytes, improving the lithium-ionic conductivity by the addition of an oxide to an inorganic solid electrolyte whose chief component is a sulfide has, as will be set forth below, been disclosed. Ways of manufacturing these inorganic solid electrolytes are by a rapid-quenching technique of a melt, or by a mechanical milling technique using a ball mill apparatus, in which raw materials react with each other. The form that the electrolytes take is chiefly powdery as well as discoid which the powder is molded into, or else quenched blocks or flakes.

A sulfide-based, highly lithium-ionic-conductive solid electrolyte that is added with an oxide is disclosed in Japanese Unexamined Pat. App. Pub. No. H04-202024. In the patent claims in this document, $Li_2O$ and $LiOH$ as oxygen-incorporating lithium compounds to which $Li_2S$—$P_2S_5$ sulfide is added are set forth, yet what the addition amount is for the oxygen-incorporating lithium compounds is not stipulated.

In Embodiment 3 of Japanese Pat. Pub. No. 3,343,936, the adding of $Li_3PO_4$ to $Li_2S$—$P_2S_5$ sulfide is disclosed. In this embodiment it is shown that adding $Li_3PO_4$ at 3 mol % (2.7 atomic % oxygen content) improves the level of ionic conductivity and the breakdown-voltage quality of the electrolyte.

In the patent claims of Japanese Unexamined Pat. App. Pub. No. 2001-250580, an amorphous lithium-ionic-conductive solid electrolyte whose composition is $aLi_3PO_4$-$bLi_2S$-$cP_2S_5$ is disclosed, with the ranges of the atomic fractions in the composition stipulated to be: a<0.3; b>0.3; c>0.2.

In Yoneda (with two others), "Mixed anion effect on lithium ion conductivity of amorphous materials in the system $Li_2O$—$Li_2S$—$P_2S_5$," *Extended Abstracts of Presentations at the 28th Symposium on Solid-State Ionics*, (November, 2002), pp. 24-25, an $Li_2O$—$Li_2S$—$P_2S_5$ composition is set forth, wherein it is given that the level of ionic conductivity becomes highest when the oxygen content is 1.9 atomic %.

On the other hand, there are no reports of the incorporation of oxygen into crystalline solid electrolytes whose chief component is phosphorous: For example, in Pat. App. Pub. No. 2001-250580, and in Hama, et 4 al., "Synthesis and High Lithium Ion Conductivity of New Glass-ceramics in the System $Li_2S$—$P_2S_5$," *Extended Abstracts of Presentations at the 26th Symposium on Solid-State Ionics*, (November, 2000), pp. 174-175, heating a non-crystalline powder $Li_2S$—$P_2S_5$ composition to crystallize it is set forth; and in Murayama, et 4 al., "Synthesis, Property and Structure of New Lithium Ionic Conductor, Thio-LISICON; Lithium Thiophosphate System," *Extended Abstracts of Presentations at the 28th Symposium on Solid-State Ionics*, pp. 178-179, a crystalline solid-electrolyte composition, $Li_{3+5x}P_{1-x}S_4$ (0≦x<0.3), in pelletized powder form is set forth.

Meanwhile, utilizing metallic lithium in negative electrodes as a technique for realizing heightened capacity in lithium secondary batteries has been attempted, but due during charging/discharging to reaction of the metallic lithium with the organic electrolytic solution contained within the battery, growth of dendrites of the lithium occurs on the negative electrode, giving rise to battery-internal shorting with the positive electrode, which presents a hazard that ultimately ends in the battery exploding. This dendritic growth is, moreover, thought to be a cause of degradation in charge/discharge capacity.

As one technique for curbing dendritic growth, on the surface of the metallic lithium either forming a polymer film, or forming an inorganic film such as a fluoride film, a carbonic film, an oxide film (claim 1 of the specification for U.S. Pat. No. 5,314,765), or a sulfide film (claim 4 of the specification for U.S. Pat. No. 6,025,094; claim 7 of Japanese Unexamined Pat. App. Pub. No. 2000-340257; claims 1-3 and 9 of Japanese Unexamined Pat. App. Pub. No. 2002-329524) have been disclosed.

In particular, in Pat. App. Pub. No. 2000-340257 and Pat. App. Pub. No. 2002-329524 oxygen being incorporated into a sulfide solid electrolyte is disclosed.

DISCLOSURE OF INVENTION

Qualities being sought out in a solid electrolyte employed in lithium secondary batteries include that its level of lithium-ionic conduction be high, that its electronic conductivity be low, and that its breakdown voltage characteristics be favorable. Further being sought, insofar as the solid electrolyte is formed on metallic lithium, is that the electrolyte be stable with respect to metallic lithium; and calls are for adhesiveness in the interface between solid-electrolyte protective films and metallic lithium, and for stability against organic electrolyte solutions. Especially in implementations in which a solid electrolyte is employed for a protective film on a metallic lithium surface, that the solid electrolyte not react with metallic lithium is a must, and that it not be reductively decomposed by the metallic lithium is crucial.

As far as lithium-ionic conductivity is concerned, a high ionic conductivity at least at the $10^{-4}$ S/cm level or more is presumably required. Organic electrolytes ordinarily have an ionic conduction level at the $10^{-3}$ S/cm mark, but with the lithium-ion transport number being on the order of 0.2 to 0.3, the actual lithium-ionic conduction level is at the $10^{-4}$ S/cm mark. Therefore for a protective film on metallic lithium, if the ionic conduction level is at the $10^{-4}$ S/cm mark or greater presumably there should be no hindrance to the flow of ions.

In turn, it is considered to be necessary that the electronic conductivity be 4 or more decimal places below that of the ionic conductivity; and it is desirable that the electrolyte be a material whose electronic conductance is a low $10^{-8}$ S/cm or less. The electronic conductivity being high leads to the metallic lithium precipitating onto the surface of the solid electrolyte film.

As far as the breakdown voltage is concerned, the electrolyte must not decompose under the application of 4 V.

In particular, it must be stable against the reducing tendency of the metallic lithium and other active negative-electrode materials, not prone to reductive decomposition, and not give rise to, or otherwise not increase, electronic conductivity.

An object of the present invention is to achieve the above-noted characteristics sought in a solid electrolyte and curb shorting due to the growth of dendrites from the metallic-lithium negative electrode, to make available highly stable, safe lithium secondary batteries of high energy density and superlative charge/discharge cyclability.

As the result of concerted investigation into the foregoing issues, it was discovered that the problems described above are resolved by constituting a solid electrolyte composition from the elements lithium, phosphorous, sulfur, and oxygen, and by controlling the oxygen content.

In particular, the present invention is as follows.

(1) A lithium secondary battery negative-electrode component material, formed by laminating onto a substrate a metallic lithium film and an inorganic solid-electrolyte film, the lithium secondary battery negative-electrode component material characterized in that the inorganic solid-electrolyte film incorporates lithium, phosphorous, sulfur, and oxygen, and is represented by the compositional formula noted below.

$a\text{Li} \cdot b\text{P} \cdot c\text{S} \cdot d\text{O}$ (Li: lithium; P: phosphorous; S: sulfur; O: oxygen), wherein the ranges of the atomic fractions in the composition are:

$0.20 \leq a \leq 0.45$;

$0.10 \leq b \leq 0.20$;

$0.35 \leq c \leq 0.60$;

$0.03 \leq d \leq 0.13$;

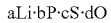

(2) The lithium secondary battery negative-electrode component material set forth in aforementioned (1), characterized in that the metallic lithium film incorporates oxygen, and the amount of oxygen incorporated is 1 atomic % or more, but 10 atomic % or less.

(3) The lithium secondary battery negative-electrode component material set forth in aforementioned (1) or (2), characterized in that the metallic lithium film is present with oxygen content in the interface between the metallic lithium film and the inorganic solid-electrolyte film being 1 atomic % or more, but 10 atomic % or less.

(4) A method of manufacturing the lithium secondary battery negative-electrode component material set forth in any of aforementioned (1) through (3), the method of manufacturing the lithium secondary battery negative-electrode component material characterized in forming the metallic lithium film and the inorganic solid-electrolyte film by a vapor deposition method, the vapor deposition method being vacuum deposition, ion plating, sputtering, or laser ablation.

(5) A lithium secondary battery characterized in employing the lithium secondary battery negative-electrode component material set forth in any of aforementioned (1) through (3).

In a lithium secondary battery negative-electrode component material according to the present invention, the inorganic solid electrolyte incorporates lithium, phosphorous, sulfur, and oxygen, and in the below-noted compositional formula—

$a\text{Li} \cdot b\text{P} \cdot c\text{S} \cdot d\text{O}$ (Li: lithium; P: phosphorous; S: sulfur; O: oxygen)

the ranges of the atomic fractions in the composition must be:

$0.20 \leq a \leq 0.45$;

$0.10 \leq b \leq 0.20$;

$0.35 \leq c \leq 0.60$;

$0.03 \leq d \leq 0.13$;

More specifically, in a sulfide-based inorganic solid electrolyte incorporating phosphorous as a constituent, having the oxygen content be 3 atomic % or more but 13 atomic % or less allows, in addition to the breakdown voltage properties and to low electronic conductivity, restraint on the electrolyte's reaction with the metallic lithium to be realized while allowing a high ionic conductivity at the $10^{-4}$ S/cm level or greater to be secured, which makes it possible to stabilize the coating efficacy of a solid electrolyte film.

Furthermore, the oxygen content of the metallic lithium film formed beneath the inorganic solid-electrolyte film influences the resistance of the inorganic solid-electrolyte film to reductive decomposition. Increasing the oxygen content of the metallic lithium film makes it possible to improve the stability of the inorganic solid-electrolyte film formed on the lithium film. That is, with rising oxygen content within the metallic lithium film, the stability of the inorganic solid-electrolyte film formed thereon increases and it will do for the oxygen content within the inorganic solid-electrolyte film to be slight. Thus, controlling the oxygen content with the metallic lithium film makes it possible to improve how well reductive decomposition of the inorganic solid-electrolyte film is kept under control. In this regard, the oxygen content with the metallic lithium film is preferably 1 atomic % or more, but 10 atomic % or less—more preferably, from 1 atomic % to 5 atomic %.

If the oxygen content within the metallic lithium is less than 1 atomic %, the reducing power of the metallic lithium intensifies, meaning that in order to increase the resistance of the inorganic solid-electrolyte film to being reduced, unnecessarily the oxygen content of the electrolyte has to be increased. Likewise, if the oxygen content within the metallic lithium film were to surpass 10 atomic %, the content would exert a negative influence on the component material's performance as the negative electrode of a lithium secondary battery. While in practical terms, there are no problems in the region from 5 atomic % to 10 atomic %, in the region below 5 atomic % the battery's performance stability is enhanced all the more.

Meanwhile, a metallic lithium film having a rich oxygen content, with up to 55 atomic % as the limit, may be formed at a fixed thickness in the interface between the metallic lithium film and the inorganic solid-electrolyte film. In that case the thickness preferably is 0.5 μm or less, more preferably 0.3 μm or less.

For assaying the oxygen and the constituent elements, the films can be analyzed using X-ray photoelectron spectroscopy (XPS). In particular, the analyzer must be a device whose analysis chamber attains a high vacuum, which preferably is $1.33 \times 10^{-9}$ hPa or less. An XPS analyzer with such capability is, to give one example, the ESCA-5400MC, manufactured by Phi Inc. It should be noted that assay in the depth-wise thickness is accomplished by analyzing the films while etching through them with the argon-ion beam sputterer that is provided with the analyzer, and the etching speed therein may be converted using the speed when $\text{SiO}_2$ is being etched. Specifically, under certain fixed etching conditions and wherein a film is etched for a certain fixed time period, the depth will differ depending on the target element, but by having it in all cases be the depth with $SiO_2$ allows a tentative yardstick to be established; in the present invention the assay is by means of this expedient.

One way that the laminated structure of the metallic lithium film and the inorganic solid-electrolyte film can be prepared is by a vapor deposition method. Examples of vapor deposition methods include a vacuum deposition, ion plating, sputtering, and laser ablation. In these vapor deposition methods, control of the oxygen content within the metallic lithium film and within the inorganic solid-electrolyte film proves to be comparatively easy by partial-pressure control of the oxygen gas within the gaseous phase, and by controlling the oxygen content within the source materials. Control of the oxygen content along the film thickness turns out to be possible besides. What is more, that fact that all of the constituent elements are deposited once having gone through the gaseous phase is thought to enable the oxygen atoms to be dispersed comparatively uniformly within the metallic lithium film and within the inorganic solid-electrolyte film, which makes it possible to design for stabilization of irregularities in the film characteristics. Finally, in preparing the inorganic solid-electrolyte film, different from techniques—as with a rapid-quenching technique—that exploit a change from a liquid to a solid state, with vapor deposition methods, a process of change from a gas state to a solid state is employed, and therefore the degree of non-crystallinity can be raised and the range of amorphous-deposition compositions can be broadened.

BEST MODE FOR CARRYING OUT THE INVENTION

In the following, according to example embodiments the present invention will be explained in further detail.

As is indicated in Fabrication Examples 1, 2 and 3 set forth below, the composition of the inorganic solid-electrolyte film, the formation of the metallic lithium film, and the control of oxygen content were investigated, and it was verified that in each case the example came out problem-free.

FABRICATION EXAMPLE 1

Deposition of Solid Electrolyte Film

By the procedure set out in the following, an inorganic solid-electrolyte film of lithium (Li)—phosphorous (P)—sulfur (S)—oxygen (O) composition was formed onto a glass substrate using laser ablation.

Lithium sulfide ($Li_2S$), phosphorous pentasulfide ($P_2S_5$), and phosphorous pentoxide ($P_2O_5$) were mixed together inside a glove box charged with argon gas of dew point −80° C., and the powder blend was put into a mold and compressed to prepare a pelletoid target.

The target was transferred from the glove box interior to, and set up inside, a film-deposition apparatus in a manner so as not to expose the target to the atmosphere, and by focusing a laser beam onto the target, the source material was vaporized and deposited as a film onto a substrate made of glass. The substrate did not become particularly heated.

The results of post-deposition analysis, which was carried out with the ESCA-5400MC by Phi Inc., of the film composition were, for the lithium (Li)—phosphorous (P)—sulfur (S)—oxygen (O) composition, 26 atomic %, 13 atomic %, 54 atomic %, and 7 atomic %, respectively.

The post-deposition sample—glass substrate and all—was fractured, and the cross-section was observed under a scanning electron microscope (SEM), wherein the solid electrolyte film measured 0.5 µm in thickness.

A digitated metal electrode was formed onto the inorganic solid-electrolyte film created on the glass substrate, and the level of ionic conduction in the inorganic solid-electrolyte film was measured by the complex impedance method, varying the sample temperature from room temperature up to 170° C. The ionic conduction characteristics following the 170° C. anneal were that the ionic conduction level at 25° C. was $1.3 \times 10^{-4}$ S/cm, and the activation energy was 38 kJ/mol.

FABRICATION EXAMPLE 2

Deposition of Solid Electrolyte Film

By the procedure set out in the following, an inorganic solid-electrolyte film of lithium (Li)—phosphorous (P)—sulfur (S)—oxygen (O) composition was formed onto a glass substrate using laser ablation.

Lithium sulfide ($Li_2S$), phosphorous pentasulfide ($P_2S_5$), and phosphorous pentoxide ($P_2O_5$) were mixed together inside a glove box charged with argon gas of dew point −80° C., and the powder blend was put into a mold and compressed to prepare a pelletoid target.

The target was transferred from the glove box interior to, and set up inside, a film-deposition apparatus in a manner so as not to expose the target to the atmosphere, and by focusing a laser beam onto the target, the source material was vaporized and deposited as a film onto a substrate made of glass. In this case, argon gas into which oxygen was mixed was employed as the deposition ambient gas. Again, the substrate did not become particularly heated.

The results of post-deposition analysis, which was carried out with Phi Inc.'s ESCA-5400MC, of the film composition were, for the lithium (Li)—phosphorous (P)—sulfur (S)—oxygen (O) composition, 26 atomic %, 15 atomic %, 55 atomic %, and 4 atomic %, respectively.

The post-deposition sample—glass substrate and all—was fractured, and the cross-section was observed under a scanning electron microscope (SEM), wherein the solid electrolyte film measured 0.5 µm in thickness.

A digitated metal electrode was formed onto the inorganic solid-electrolyte film created on the glass substrate, and the level of ionic conduction in the inorganic solid-electrolyte film was measured by the complex impedance method, varying the sample temperature from room temperature up to 170° C. The ionic conduction characteristics following the 170° C. anneal were that the ionic conduction level at 25° C. was $4 \times 10^{-4}$ S/cm, and the activation energy was 36 kJ/mol.

The same results were obtainable by sputtering, vapor deposition, and ion plating carried out as the film deposition technique.

FABRICATION EXAMPLE 3

Deposition of Metallic Lithium Film

By the procedure set out in the following, a metallic lithium film was formed onto copper foil.

A copper foil substrate was anchored to a support pedestal attached to a baseplate cooling mechanism within a vacuum deposition device. A metallic lithium coupon serving as the source material was placed into the heating chamber of the vacuum deposition device, and the device interior was pumped down to a vacuum. A minuscule amount of oxygen was introduced into the heating chamber, and the lithium was deposited as a film by heating the chamber.

The results of post-deposition analysis, which was carried out with Phi Inc.'s ESCA-5400MC, of the oxygen depth-wise in the film were 52 atomic % in the surface, but 5 atomic % at a depth of 0.46 μm. The surface oxygen was due to the face of the sample being oxidized in the handling stage. The oxidized surface layer can be removed by an ion bombardment process before the inorganic solid-electrolyte film is deposited.

EMBODIMENT 1

Rolled copper foil of 10 μm thickness was employed as the substrate, and a metallic lithium film was formed onto this substrate by a vapor deposition technique in the same way as in Fabrication Example 3. The thickness of the metallic lithium film measured 5 μm. The film thickness was assayed by measuring the film with a four-point probe. Then further, in the same way as in Fabrication Example 1 an inorganic solid-electrolyte film of lithium (Li)—phosphorous (P)—sulfur (S)—oxygen (O) composition was deposited to a thickness of 0.5 μm by laser ablation onto, after ion-bombardment treating, the substrate on which the metallic lithium film had been formed. With the inorganic solid-electrolyte film being colorless and transparent, the hue of the sample took on the color of the underlying metallic lithium. This series of fabrication processes was carried out within a dry argon gas atmosphere.

The composition of the inorganic solid-electrolyte film was analyzed using X-ray photoelectron spectroscopy (XPS). For the analyzer, Phi Inc.'s ESCA-5400MC was employed, wherein a preselected chamber was used, and the sample was placed within the analyzer without the sample coming into contact with the atmosphere. The resulting breakdown of the inorganic solid-electrolyte film composition immediately post-fabrication was: Li, 26 atomic %; P, 15 atomic %; S, 55 atomic %; and O, 4 atomic %.

Furthermore, in depth-wise profile, with further depth past the inorganic solid-electrolyte layer the Li quantity had increased, while the other elements had decreased. And the O content at the point where P and S were no longer detected was 3 atomic %.

The sample after fabrication was kept in dry argon gas to examine its stability over time. At the stage when 3 months had elapsed following fabrication the transparency of the inorganic solid-electrolyte film had not changed, nor was there change in the hue of the sample. The inorganic solid-electrolyte film composition was again analyzed by XPS and had not changed by comparison to what it was immediately post-fabrication.

EMBODIMENT 2

A metallic lithium film and an inorganic solid-electrolyte film were formed by the method of Embodiment 1, and then a metal electrode was mask-formed onto the inorganic solid-electrolyte film.

The direct-current resistance of the sample on which the metal electrode had been formed was measured. The measurement was made between a metal probe contacted onto the metal electrode, and the copper foil, wherein the resistance is measured based on the lithium-ionic conduction while the metal electrode side is made negative and lithium ions within the inorganic solid-electrolyte film flow from the metallic lithium side to the metal electrode side. Meanwhile, when the metal electrode side is made positive no lithium ions are transmitted from the metal electrode side, and thus the electronic conduction level of the inorganic solid-electrolyte film is measured. As a result, by measurement in the ionic-conduction direction a value of 5 Ω was indicated, and by measurement in the electronic-conduction direction, 1 MΩ was. In addition, with the object of gauging change over time the measurements were repeated 3 months later, wherein the same values were indicated. The series of fabrication processes herein was carried out within a dry argon gas atmosphere.

EMBODIMENT 3

Rolled copper foil of 10 μm thickness was employed as the substrate, and a metallic lithium film was formed onto this substrate by a vapor deposition technique in the same way as in Fabrication Example 3. The thickness of the metallic lithium film measured 5 μm. The film thickness was assayed by measuring the film with a four-point probe. Then further, in the same way as in Fabrication Example 2 an inorganic solid-electrolyte film of lithium (Li)—phosphorous (P)—sulfur (S)—oxygen (O) composition was deposited to a thickness of 0.5 μm by laser ablation onto the substrate on which the metallic lithium film had been formed. With the inorganic solid-electrolyte film being colorless and transparent, the hue of the sample took on the color of the underlying metallic lithium. This series of fabrication processes was carried out within a dry argon gas atmosphere.

The composition of the inorganic solid-electrolyte film was analyzed using X-ray photoelectron spectroscopy (XPS). For the analyzer, Phi Inc.'s ESCA-5400MC was employed, wherein a preselected chamber was used, and the sample was placed within the analyzer without the sample coming into contact with the atmosphere. The resulting breakdown of the inorganic solid-electrolyte film composition immediately post-fabrication was: Li, 29 atomic %; P, 13 atomic %; S, 53 atomic %; and O, 5 atomic %.

Furthermore, in depth-wise profile, just past the inorganic solid-electrolyte layer the O content had increased, growing to a maximum 52 atomic %, and with further depth the O content had decreased, while the Li quantity had increased. The thickness of the layer in which the O content had increased to 10 atomic % or more was 0.23 μm. And the O content at the point where P and S were no longer detected was 1 atomic %.

The sample after fabrication was kept in dry argon gas to examine its stability over time. At the stage when 3 months had elapsed following fabrication the transparency of the inorganic solid-electrolyte film had not changed, nor was there change in the hue of the sample. The inorganic solid-electrolyte film composition was again analyzed by XPS and had not changed by comparison to what it was immediately post-fabrication.

EMBODIMENT 4

The sample prepared in Embodiment 1 was die-cut at 15 mm diameter into a negative electrode.

A positive electrode was fashioned by mixing $LiCoO_2$ serving as an active material, carbon particles for imparting electronic conductivity, and polyvinylidene fluoride, together with an organic solvent, and spreading the mixture onto aluminum foil. The positive-electrode thickness was 100 μm, with a volumetric energy density of 3 mA·h (milliamperes·hour)/$cm^2$ (square centimeters), the positive-electrode diameter was 15 mm, and the total capacity was 5.3 mA·h.

A lithium secondary battery was produced by setting the negative electrode, a separator (porous polymer film), and the positive electrode into a coin-shaped cell under an argon gas atmosphere of dew point −80° C. or less, and then trickling into the cell an organic electrolyte solution, in which 1 mol % of $LiPF_6$ as an electrolyte salt was dissolved into a mixed solution of ethylene carbonate and propylene carbonate.

A charge/discharge cycling test was carried out under 2.7-mA constant-current conditions at a charging voltage of 4.2 V and a discharging voltage of 3.0 V. The result was that even after 500 cycles internal shorting had not been caused, wherein deterioration in capacity was not apparent.

Following the charge/discharge cycling test, the coin cell was broken down, and the negative electrode was taken out, observed under a scanning electron microscope (SEM), and put through energy dispersion X-ray spectroscopy (EDX). No dendritic growth of the metallic lithium could be seen, while the inorganic solid-electrolyte layer was observed to be retained on the negative-electrode surface.

A positive electrode was fashioned by mixing $LiCoO_2$ serving as an active material, carbon particles for imparting electronic conductivity, and polyvinylidene fluoride, together with an organic solvent, and spreading the mixture onto aluminum foil. The positive-electrode thickness was 100 μm, with a volumetric energy density of 3 mA·h (milliamperes·hour)/$cm^2$ (square centimeters), the positive-electrode diameter was 15 mm, and the total capacity was 5.3 mA·h.

A lithium secondary battery was produced by setting the negative electrode, a separator (porous polymer film), and the positive electrode into a coin-shaped cell under an argon gas atmosphere of dew point −80° C. or less, and then trickling into the cell an organic electrolyte solution, in which 1 mol % of $LiPF_6$ as an electrolyte salt was dissolved into a mixed solution of ethylene carbonate and propylene carbonate.

A charge/discharge cycling test was carried out under 2.7-mA constant-current conditions at a charging voltage of 4.2 V and a discharging voltage of 3.0 V. The result was that even after 500 cycles internal shorting had not been caused, wherein deterioration in capacity was not apparent.

Following the charge/discharge cycling test, the coin cell was broken down, and the negative electrode was taken out, observed under a scanning electron microscope (SEM), and put through energy dispersion X-ray spectroscopy (EDX). No dendritic growth of the metallic lithium could be seen, while the inorganic solid-electrolyte layer was observed to be retained on the negative-electrode surface.

EMBODIMENTS 6-12

Lithium secondary batteries of the same configuration as in Embodiment 4, but in which the composition of the inorganic solid-electrolyte film was altered were produced, and their characteristics were examined. The results are set forth in Table 1. It should be understood that in the present embodiments, deposition of the inorganic solid-electrolyte films was executed by laser ablation, but fabrication of the films is not limited to this technique and can be by other methods such as vacuum deposition and RF sputtering.

TABLE I

| | Solid electrolyte film composition (XPS breakdown figures) | | | | Hue change (after 3 mo.) | DC resistance (Ω) | | | Ionic cond. level by complex impedance meth. (170° C. anneal) | | Charge/ discharge cycle |
|---|---|---|---|---|---|---|---|---|---|---|---|
| Embod. no. | Li | P | S | O | | Ionically conducting | Electronically conducting | Elapsed-time change (after 3 mo.) | S/cm | kJ/mol | |
| 6 | 41 | 11 | 35 | 13 | No | 15 | 1 M | No | $1.0 \times 10^{-4}$ | 40 | Over 500 |
| 7 | 26 | 13 | 52 | 9 | No | 10 | 1 M | No | $1.1 \times 10^{-4}$ | 39 | Over 500 |
| 8 | 26 | 13 | 54 | 7 | No | 8 | 1 M | No | $1.3 \times 10^{-4}$ | 38 | Over 500 |
| 9 | 26 | 15 | 55 | 4 | No | 5 | 1 M | No | $3.0 \times 10^{-4}$ | 36 | Over 500 |
| 10 | 20 | 20 | 57 | 3 | No | 4 | 1 M | No | $3.0 \times 10^{-4}$ | 36 | Over 500 |
| 11 | 45 | 10 | 42 | 3 | No | 3 | 1 M | No | $5.0 \times 10^{-4}$ | 35 | Over 500 |
| 12 | 23 | 14 | 60 | 3 | No | 4 | 1 M | No | $4.0 \times 10^{-4}$ | 36 | Over 500 |

EMBODIMENT 5

The sample prepared in Embodiment 3 was die-cut at 15 mm diameter into a negative electrode.

COMPARATIVE EXAMPLES 1 & 2

Lithium secondary batteries of the same configuration as in Embodiment 4, but in which the composition of the inorganic solid-electrolyte film was outside the scope of the present invention were produced as comparative examples, and their battery characteristics were examined. The results are set forth in Table II. In addition, the degenerated condition after 1 month of the sample presented in Comparative Example 1 is set forth in Table III.

With Comparative Example 1, because with its oxygen content being low there is no stability in its inorganic solid-electrolyte film over time, the battery performance falls short. In turn, in Comparative Example 2, because the oxygen content is overabundant, the ionic conductivity falls short, and the battery performance does not prove to be sufficient.

TABLE II

| | Solid electrolyte film composition (XPS breakdown figures) | | | | Experimental results | | | | | |
|---|---|---|---|---|---|---|---|---|---|---|
| | | | | | Hue change (after 3 mo.) | DC resistance (Ω) | | Ionic cond. level by complex impedance meth. (170° C. anneal) | | Charge/discharge cycle |
| Comp. ex. no. | Li | P | S | O | | Ionically conducting | Electronically conducting | Elapsed-time change (after 3 mo.) | S/cm | kJ/mol | |
| 1 | 26 | 15 | 57 | 2 | Yes | 3 | 1 M | Yes | $5 \times 10^{-4}$ | 35 | 150 |
| 2 | 21 | 13 | 41 | 15 | Yes | 10 | 1 M | No | $2 \times 10^{-4}$ | 51 | 200 |

TABLE III

| | Solid electrolyte film composition (XPS breakdown figures) | | | | Experimental results | | |
|---|---|---|---|---|---|---|---|
| | | | | | Hue change (after 3 mo.) | DC resistance (Ω) (after 1 mo.) | |
| Comp. ex. no | Li | P | S | O | | Ionically conducting | Electronically conducting |
| 1 | 65 | 5 | 28 | 2 | Turned black, green, opaque | 1000 | 1 M |

COMPARATIVE EXAMPLES 3 & 4

Metallic lithium films of the same configuration as in Embodiment 4, but in which the oxygen content was outside the scope of the present invention were formed as comparative examples, and their cyclability in a battery was examined. The results are set forth in Table IV.

With Comparative Example 3, because with its oxygen content being low there is no stability in its inorganic solid-electrolyte film over time, the battery performance falls short. In turn, in Comparative Example 4, because the oxygen content is overabundant, the battery performance does not prove to be sufficient.

TABLE IV

| | Solid electrolyte film composition (XPS breakdown figures) | | | | Metallic Lithium | Experimental results | |
|---|---|---|---|---|---|---|---|
| Comp. ex. no | Li | P | S | O | O | Hue change (after 1 mo.) | Charge/discharge cycle |
| 3 | 28 | 15 | 55 | 2 | <0.5 | Yes | 150 |
| 4 | 28 | 15 | 55 | 2 | 11 | No | 100 |

INDUSTRIAL APPLICABILITY

In accordance with the present invention as given in the foregoing, shorting due to the growth of dendrites from a metallic-lithium negative electrode is suppressed to achieve highly stable, safe lithium secondary batteries of high energy density and superlative charge/discharge cyclability.

The invention claimed is:

1. A lithium secondary battery negative-electrode component material formed by laminating onto a substrate a metallic lithium film and an inorganic solid-electrolyte film, said metallic lithium film incorporating oxygen in an amount that is 1 atomic % or more, but 10 atomic % or less, and said inorganic solid-electrolyte film incorporating lithium, phosphorous, sulfur, and oxygen, in a composition represented by the compositional formula:

$a$Li·$b$P·$c$S·$d$O (Li: lithium; P: phosphorous; S: sulfur; O: oxygen), wherein the ranges of the atomic fractions in the composition are:

$0.20 \leq a \leq 0.45$;

$0.10 \leq b \leq 0.20$;

$0.35 \leq c \leq 0.60$;

$0.03 \leq d \leq 0.13$;

$(a+b+c+d=1)$.

2. The lithium secondary battery negative-electrode component material set forth in claim 1, further comprising an additional metallic lithium film having an oxygen content that is 10 atomic % or more, but 55 atomic % or less, provided in the interface between the metallic lithium film and the inorganic solid-electrolyte film.

3. A lithium secondary battery comprising the lithium secondary battery negative-electrode component material set forth in claim 1.

4. A method of manufacturing the lithium secondary battery negative-electrode component material set forth in claim 1, the method comprising forming the metallic lithium film and the inorganic solid-electrolyte film by a vapor deposition method selected from vacuum deposition, ion plating, sputtering, and laser ablation.

* * * * *

UNITED STATES PATENT AND TRADEMARK OFFICE
CERTIFICATE OF CORRECTION

PATENT NO. : 7,416,815 B2 Page 1 of 1
APPLICATION NO. : 10/542311
DATED : August 26, 2008
INVENTOR(S) : Nobuhiro Ota et al.

It is certified that error appears in the above-identified patent and that said Letters Patent is hereby corrected as shown below:

On the Title page item (54) and Col. 1, lines 1 & 2

In the title, "FOR LITHIUM BATTERY" should read --FOR SECONDARY LITHIUM BATTERY--.

Signed and Sealed this

Thirteenth Day of January, 2009

JON W. DUDAS
*Director of the United States Patent and Trademark Office*